United States Patent

[11] 3,620,515

| [72] | Inventors | Edwin P. Usiak<br>Fairview Park;<br>Albert C. Tucker, Rocky River, both of Ohio |
|---|---|---|
| [21] | Appl. No. | 878,438 |
| [22] | Filed | Nov. 20, 1969 |
| [45] | Patented | Nov. 16, 1971 |
| [73] | Assignee | Lee Wilson Engineering Company, Inc.<br>Cleveland, Ohio |

[54] APPARATUS FOR CONTROLLING FLOW TO AND FROM A BLOWER
4 Claims, 11 Drawing Figs.

| [52] | U.S. Cl. | 263/40 R |
|---|---|---|
| [51] | Int. Cl. | F27b 5/16 |
| [50] | Field of Search | 263/40, 41, 42, 43, DIG. 2 |

[56] References Cited
UNITED STATES PATENTS

| 3,114,539 | 12/1953 | Wilson et al. | 263/40 |
| 3,163,694 | 12/1964 | Ipsen | 263/40 X |

*Primary Examiner*—Kenneth W. Sprague
*Attorney*—Bosworth, Sessions, Herrstrom & Cain

ABSTRACT: Apparatus for controlling the flow of atmosphere to and from a centrifugal blower such as in a circulating-atmosphere heat-treating furnace. The apparatus includes an inlet flow regulator with a long narrow inlet for receiving atmosphere from a shallow plenum, and a circular outlet to the blower, the blower having a much larger diameter than the height of the inlet and plenum. The regulator equalizes the inlet flow rate across the width of the plenum so that the flow of atmosphere is more uniform throughout the interior of the furnace.

PATENTED NOV 16 1971 3,620,515

INVENTORS
EDWIN P. USIAK &
ALBERT C. TUCKER
BY *Bosworth, Sessions,
Herrstrom & Cain*
ATTORNEYS

PATENTED NOV 16 1971 3,620,515

INVENTORS
EDWIN P. USIAK &
ALBERT C. TUCKER
BY Bosworth, Sessions,
Herrstrom & Cain
ATTORNEYS

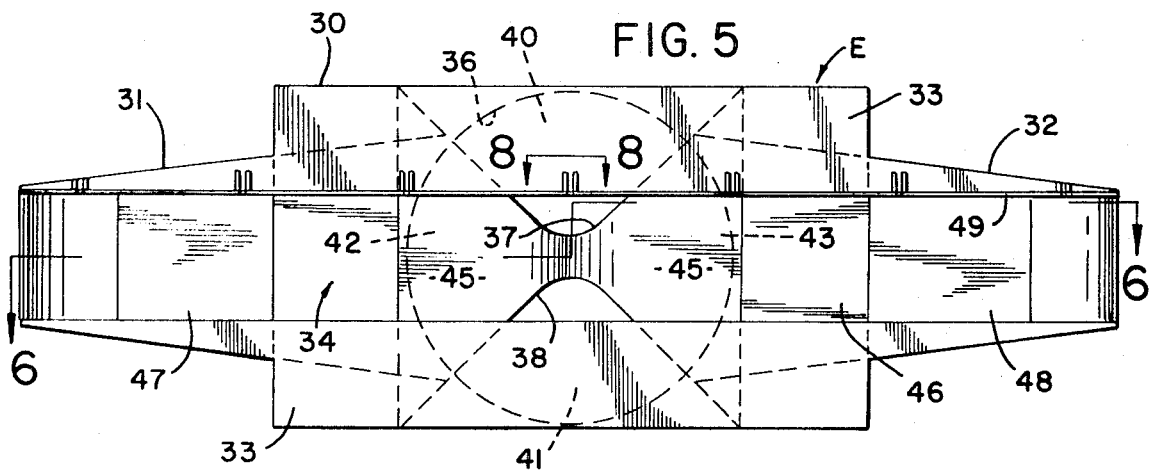
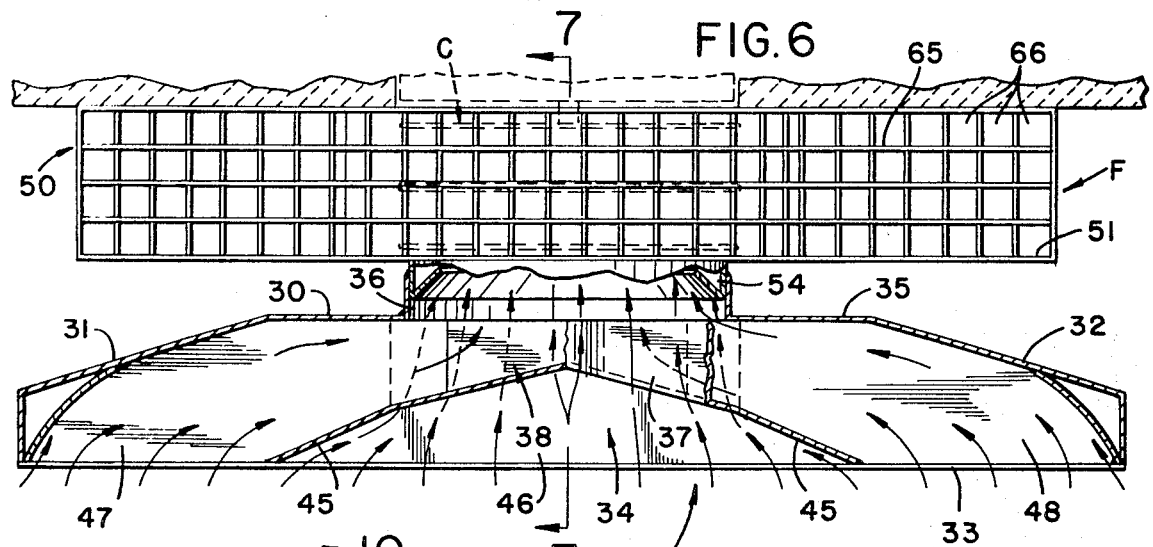
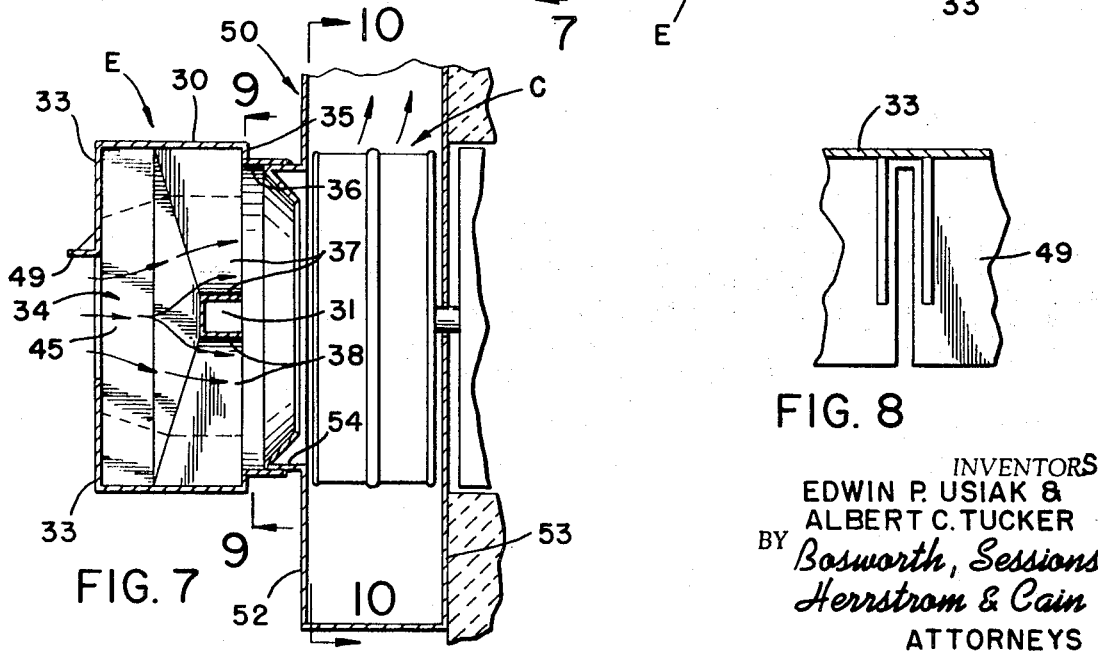
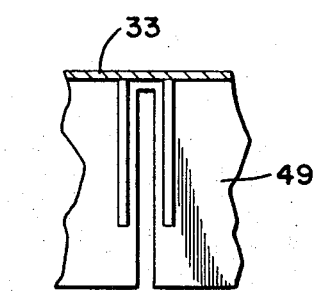
FIG. 8
INVENTORS
EDWIN P. USIAK &
ALBERT C. TUCKER
BY *Bosworth, Sessions, Herrstrom & Cain*
ATTORNEYS

APPARATUS FOR CONTROLLING FLOW TO AND FROM A BLOWER

BACKGROUND OF THE INVENTION

THis invention relates to apparatus for controlling the flow to and from blowers for moving gasses, such as centrifugal blowers, and especially centrifugal blowers mounted in furnaces for the annealing of open coils of metal strip using circulating heated atmosphere. While the invention is not limited in application to annealing furnaces it has particular utility in connection therewith as a means for providing a more uniform circulation of atmosphere through the open coils of metal strip and through the heating tubes or other heat transfer means.

Coils of steel strip in open form are commonly annealed or otherwise subjected to treatment requiring heating of the coils by supporting an open coil in a furnace chamber and repeatedly circulating between the spaced convolutions, heated atmosphere of the proper and desired composition (preferably oxygen free). It will be understood that where the term "anneal" is used it is used in a broad sense to include not only strictly technical annealing but any other processing procedure which involves heating of the coils.

Various types of furnaces may be employed to carry out the heating operation, for example furnaces of the general type disclosed in U.S. Pat. No. 3,446,491. In furnaces of this type an open coil is supported on a grid which is located over a plenum located below the coil-supporting surface. The grid permits the atmosphere to pass uniformly through the open coil to the plenum below and be recirculated by suitable fans, etc.

The grid elements are supported by vertical structural members which define parallel channels in the plenum. The atmosphere in the plenum is drawn through the channels into the centrifugal blower which propels the atmosphere to an array of heating tubes where it is heated before it reaches the top of the open coil. The axis of the blower is generally aligned with the longitudinal center line of the plenum parallel with the channels.

In circulating-atmosphere furnaces of this type a particular problem has been that of heating the convolutions of the open coil uniformly all around their circumference. Because the circulating gas must change direction several times in its circuit and because the axis of the centrifugal blower is located at the center line of the plenum, the flow rate of the gas tends to be higher in the zone adjacent the center line of the plenum than at the sides spaced farthest from the axis of the blower. As a result the portions of the coil convolutions at the opposite sides of the furnace relative to the axis of the furnace blower are heated more slowly than at other locations. This causes the total annealing time with the coil in the furnace to be substantially longer than might otherwise be necessary.

THe apparatus of the present invention satisfies the difficulties indicated above and affords other features and advantages not obtainable from the prior art.

SUMMARY OF THE INVENTION

It is among the objects of the invention to reduce the annealing time required for open coils of metal strip in a gas atmosphere annealing furnace.

Another object of the invention is to equalize the flow rate of a gas atmosphere across the width of the plenum in a heat-treating furnace.

Still another object is to provide a flow regulator for use in connection with a centrifugal blower whereby incoming gas is drawn through a wide but low inlet port and directed to a circular outlet port of much larger diameter than the height of the inlet, in such a way that the flow rate is generally uniform from one end of the inlet to the other.

These and other objects are accomplished by means of an inlet flow regulator located between the plenum and a centrifugal blower and comprising a "boxlike" walled structure defining a chamber having a vertical rear wall with a central circular opening to the blower and a vertical front wall parallel to the rear wall, with an elongated inlet opening communicating with the plenum and having dimensions generally corresponding to the height and width of the plenum. Within the boxlike walled structure are radial partitions extending axially part way into the regulator chamber and dividing the circular opening into upper and lower quadrants and side quadrants. Also within the chamber is a vertical partition dividing the inlet opening into a central port and two end ports and defining, with the radial partitions, a flow-dividing duct from the central inlet port section to the upper and lower quadrants of the blower opening. THe vertical partition also defines, with the radial partitions, two generally radial ducts from the end ports of the inlet opening to the respective side quadrants to equalize the flow rate of atmosphere in the furnace across the width of the plenum.

The invention also contemplates an outlet duct for the fan of a generally involute-type configuration which is adapted to propel the atmosphere outwardly therefrom in a cross section of elongated rectangular form, and which has over the top of the outlet an "egg crate" shaped grid which separates the area into small rectangular sections to straighten and modulate the flow of atmosphere driven therethrough by the centrifugal blower.

BRIEF DESCRIPTION OF THE DRAWINGS

FIG. 5 is a front elevation of the inlet flow regulator of FIGS. 2 and 4 taken from the line 5—5 of FIG. 3;

FIG. 6 is a fragmentary horizontal section on an enlarged scale taken of the line 6—6 of FIG. 5 with parts broken away for the purpose of illustration;

FIG. 7 is a fragmentary sectional view on an enlarged scale taken on the line 7—7 of FIG. 6;

FIG. 8 is a fragmentary sectional view on an enlarged scale taken on the line 8—8 of FIG. 5;

DESCRIPTION OF THE PREFERRED EMBODIMENT

Figure 1:
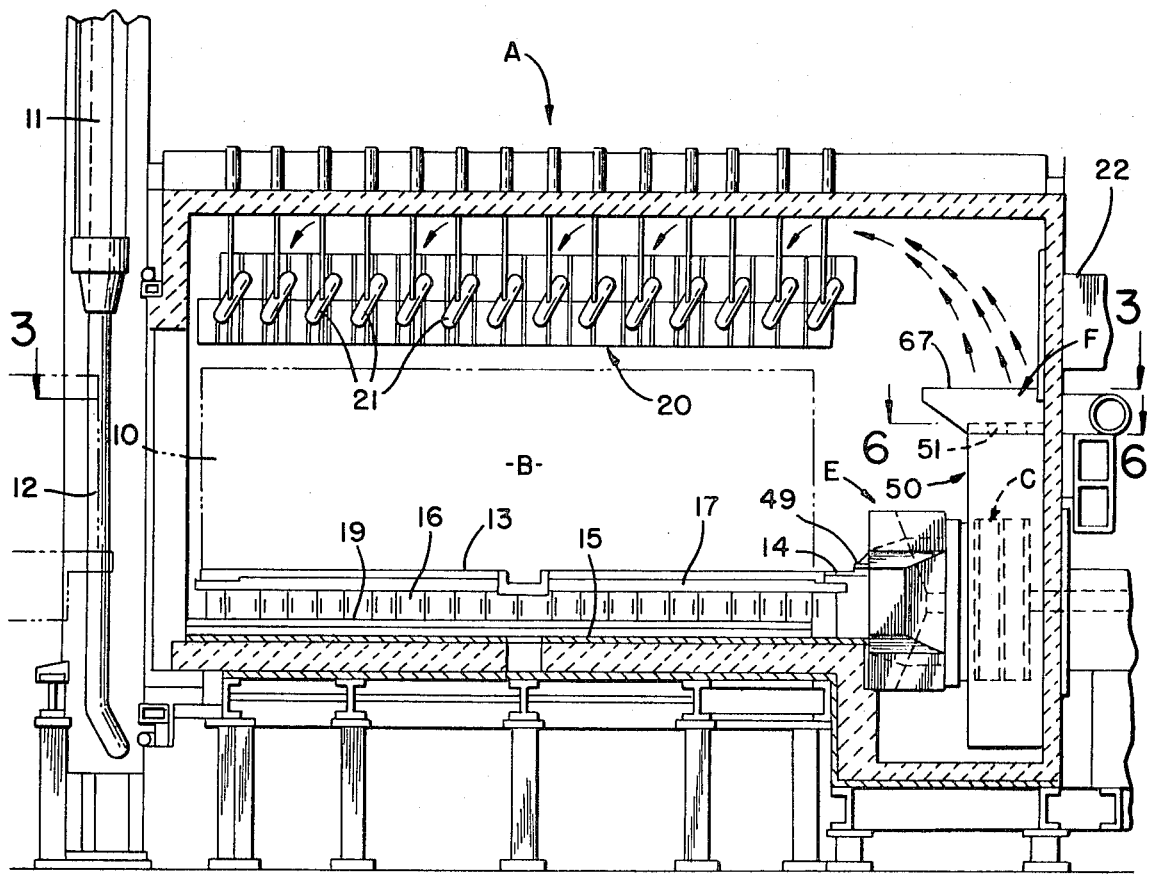
FIG. 1 is a vertical section through the center of a furnace for annealing open coils of metal strip and having apparatus embodying the invention for controlling the flow of furnace atmosphere.
Figure 2:
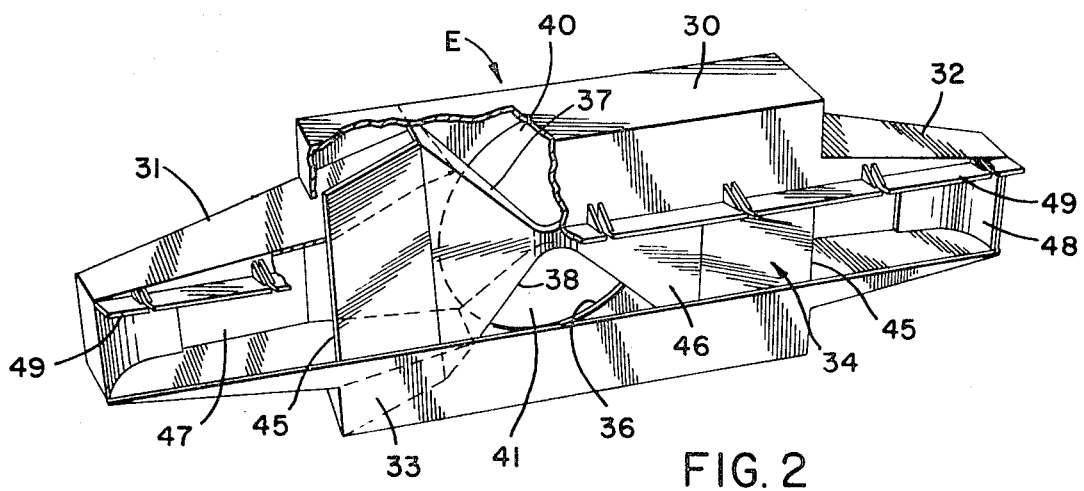
FIG. 2 is a perspective view showing the front of an inlet flow regulator for the furnace of FIG. 1 with parts broken away for the purpose of illustration.
Figure 11:
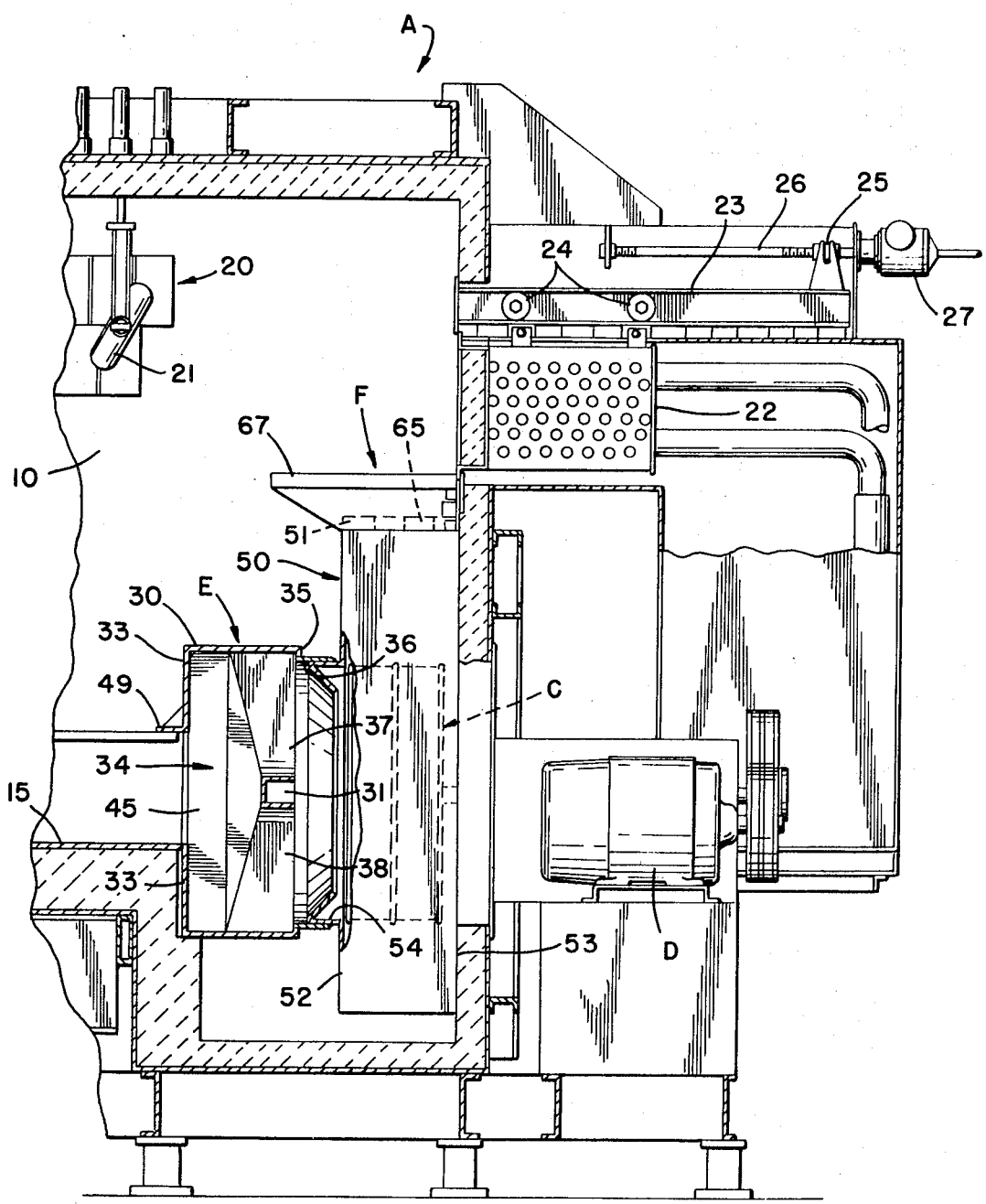
FIG. 11 is a fragmentary vertical section on an enlarged scale showing the rearward portion of the annealing furnace and flow control apparatus embodying the invention.

Referring more particularly to the drawings there is shown in FIG. 1 an annealing furnace A for use in the treatment of an open coil B (shown in phantom lines) by the use of circulating heated atmosphere. The atmosphere is circulated at a high flow rate by means of a centrifugal blower C driven through belts and pulleys by an electric motor D (FIG. 11). The atmosphere which is typically a mixture of nitrogen and hydrogen, is drawn to the blower C through an inlet flow regulator E. THe blower C propels the atmosphere upwardly toward the top of the furnace through an involute-type outlet duct F.

GENERAL ARRANGEMENT

Figure 3:
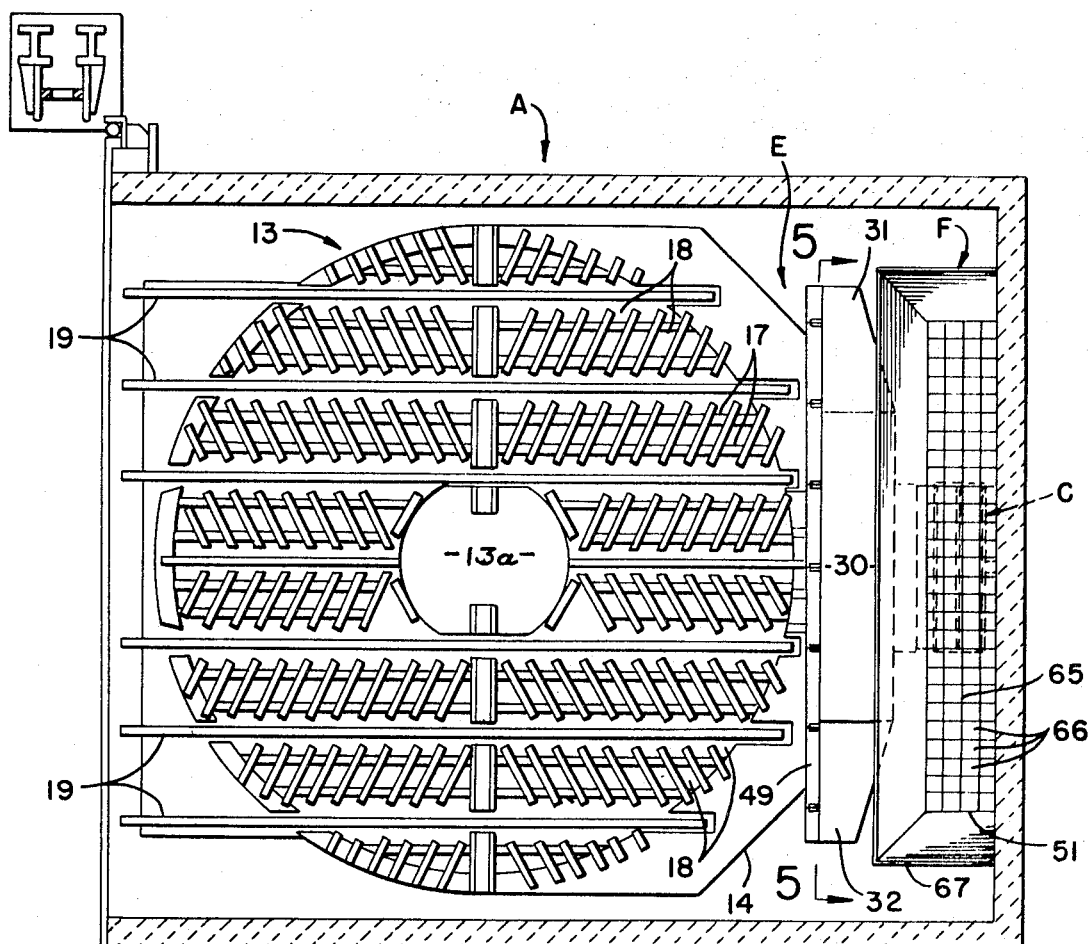
FIG. 3 is a horizontal section taken on the line 3—3 of FIG. 1.
Figure 4:
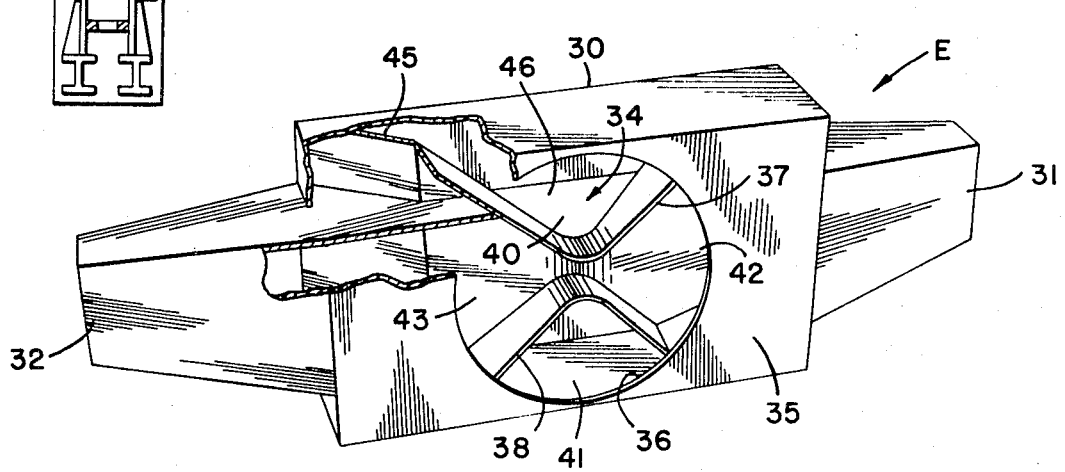
FIG. 4 is a perspective view showing the rearward side of the inlet flow regulator of FIGS. 1 and 3 with parts broken away for the purpose of illustration.
Figure 9:
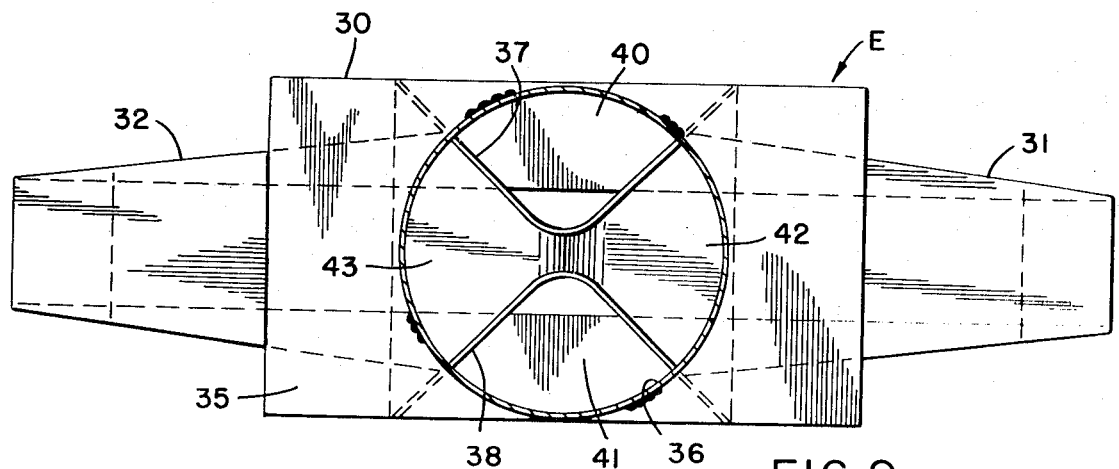
FIG. 9 is a vertical section showing the inlet flow regulator and taken on the line 9—9 of FIG. 7.

THe furnace A defines a heating chamber 10 in which the open coil B to be annealed is placed, and has an access opening at the left-hand side thereof as viewed in FIG. 1 for loading and removing coils. THe opening is closed by a door 11 which is guided during raising and lowering by tracks 12. An open coil B of steel or other metal strip is supported within the heating chamber 10 on a grid 13 formed of relatively small supporting elements around which the atmosphere may pass to the space below. The grid is of circular form (see FIG. 3) with a diameter slightly larger than the diameter of the coil B of metal strip. THe marginal spaces in the bottom of the heating chamber 10 adjacent the grid 13 are covered by a marginal plate 14 which limits the flow of atmosphere to passage through the grid. Also the center of the grid 13 is closed by a circular plate 13a to prevent atmosphere from flowing through the central space in the coil B.

Between the surface defined by the grid 13 and marginal plate 14 and the floor 15 of the furnace heating chamber 10 is a plenum 16 which receives the heated atmosphere after it passes between the adjacent convolutions of the coil B. Within the plenum 16 are vertical supporting members 17 which serve to support the grid 13 and marginal plate 14.

The supporting members 17 define parallel channels 18 extending through the plenum 16 in a direction generally perpendicular to the door 11 and parallel to the axis of the centrifugal blower C. Within the parallel channels 18 are tracks 19 that support the wheels of a transfer car used to lead coils into the furnace A. The general furnace construction and the handling of open coils as they are loaded in and removed from the furnace are described in more detail in U.S. Pat. No. 3,446,491.

The circulating atmosphere is heated before it passes through the convolutions of the open coil B by means of a heat transfer unit 20 located at the top of the furnace A and which contains a number of radiant heating tubes 21 that are heated by combustion from within and thus transfer heat to the circulating atmosphere driven through the heat transfer unit 20 by the centrifugal blower C.

After the annealing is completed the combustion in the heating tubes 21 is stopped and the cooling of the coil B to a temperature low enough to permit its removal from the furnace is hastened by means of a cooling unit (FIG. 11). The cooling unit 22 contains water-cooled coils and is mounted on parallel beams 23 that can be moved into and out of the heating chamber 10 on rollers 24. The beams are connected to a threaded nut 25 which is propelled axially along a screw 26 as the screw is turned by a motor 27. When the cooling unit 22 is extended it is positioned over the exit end of the outlet duct F so that all of the gas atmosphere driven through the outlet duct F by the centrifugal blower C passes around the refrigeration coils of the cooling unit 22.

THE INLET FLOW REGULATOR

Interposed between the centrifugal blower C and the plenum 16 is the inlet flow regulator E. The regulator E comprises a walled boxlike structure having a central section 30 and two end sections 31 and 32 of somewhat smaller dimensions and which taper toward the outer ends and toward the front. The central portion 30 and end sections 31 and 32 have a common front wall 33 with an elongated rectangular inlet opening 34 extending the full width of the regulator and having approximately the same height and width as the plenum 16. It will be seen that the height of the inlet opening 34 is only about one-third the diameter of the centrifugal blower C.

THe rear wall 35 of the central section 30 has a circular opening 36 of approximately the same diameter as the inlet to the centrifugal blower C. Located in the central section 30 and extending in a radial direction relative to the circular opening 36 are two partitions 37 and 38 extending axially from the rear wall 35 forwardly for about half the depth of the chamber. Both of the radial partitions 37 and 38 are formed with a 90° bend and they are oriented with respect to the opening 36 to define four quadrants for the opening 36 including an upper quadrant 40, a lower quadrant 41 and two side quadrants 42 and 43 (see FIG. 5).

Also located within the central section 30 is a vertical partition 45 with its end edges positioned adjacent the front wall 33 within the central section 30 so as to define in the inlet opening 34 a central inlet port 46 and two end inlet ports 47 and 48. Located above the inlet opening 34 is a narrow flange 49 which is positioned over the marginal plate 14 to prevent entry of atmosphere into the regulator E from the space above the plenum 16.

The partition 45 is formed with an inward bend so that it tapers outwardly until it intersects the radial partitions 37 and 38. At this point it tapers less sharply with its edges defined by the inward edges of the radial partitions 37 and 38. Thus the vertical partition 45 defines with the radial partitions 37 and 38 a central passage extending from the central inlet port 46 and dividing into two branches to the upper and lower quadrants 40 and 41 respectively of the outlet opening 36.

The rearward side of the vertical partition 45 defines with the radial partitions 37 and 38, two end ducts extending from the end inlet ports 47 and 48 respectively, to the side quadrants 42 and 43 respectively of the outlet opening 36. Thus the centrifugal blower C receives approximately half the total volume of atmosphere to be propelled through the upper and lower quadrants 40 and 41, about one quarter through the side quadrant 42 and about another quarter through the side quadrant 43.

THe ducts defined within the chamber are of such form that the cross section of the stream flow remains fairly uniform although gradually decreasing toward the outlet opening 36 since the total area of the outlet opening 36 is somewhat smaller than the total area of the inlet opening 34. Thus the duct configuration minimizes turbulence even though the streamlines of flow must make fairly sharp changes in direction in their travel through the flow regulator E.

With this arrangement the centrifugal blower C draws atmosphere from the plenum 16 at a generally uniform flow rate all across the width thereof. This assures that the volume of gas and flow rate of gas passing through the convolutions of the open coil at the portions closest the sidewalls of the annealing furnace A is approximately the same, and thus the heating is approximately the same as at other portions closer to the center of the coil B.

THE OUTLET DUCT

Figure 10:
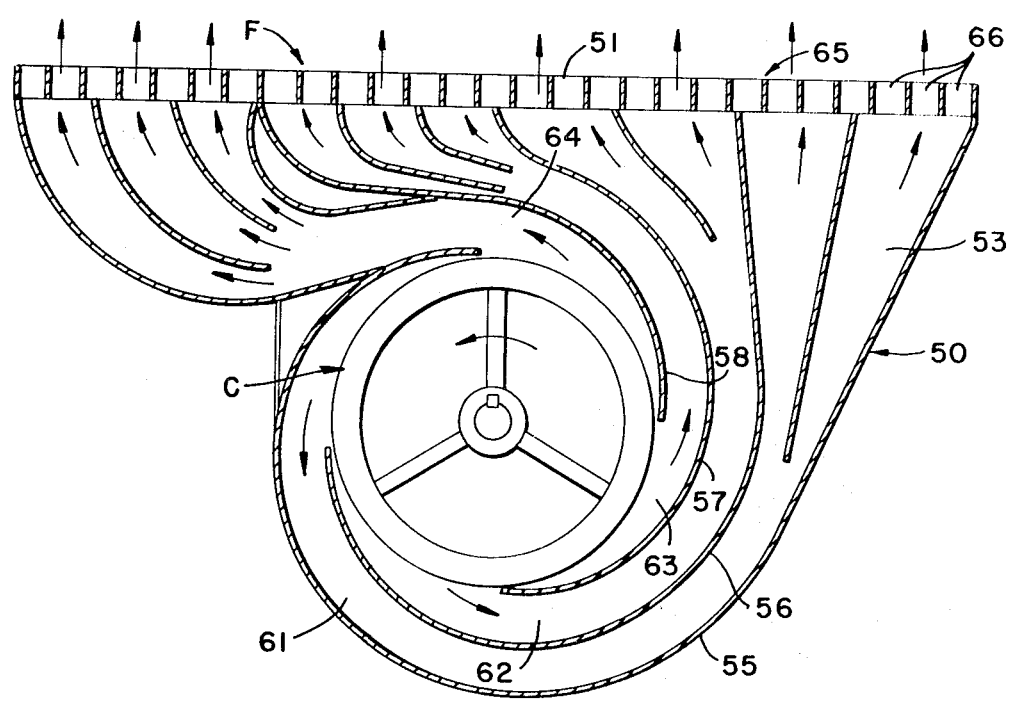
FIG. 10 is a vertical section showing the outlet flow duct for the centrifugal fan taken on the line 10—10 of FIG. 7.

The outlet duct F for the centrifugal blower C is best shown in FIGS. 6 and 10. The duct comprises an enclosure or shroud 50 that encloses the blower C and is adapted to direct the centrifugally propelled atmosphere upward toward the top of the furnace A through an elongated rectangular outlet port 51. The enclosure 50 has parallel sidewalls 52 and 53 spaced apart slightly more than the axial length of the blower C and the inwardly facing sidewall 52 has a flanged circular opening 54 of approximately the same diameter as the blower C. The sidewall 52 is secured to the rear wall 35 of the central section 30 of the inlet flow regulator E with the circular opening 54 in registration with the outlet opening 36 in the rear wall 35 (see FIG. 6).

Located between the sidewalls 52 and 53 are four curved partition walls 55, 56, 57, and 58 which take the general form of involutes generated from the circumference of the circular opening 54. The inner ends of the walls 55, 56, 57, and 58 are spaced 90° apart around the circumference of the circular opening 54 and they extend to the rectangular outlet port 51. The walls 55, 56, 57, and 58 define four involute-shaped ducts 61, 62, 63, and 64 that increase in cross section toward the outlet port 51 and which direct the flow of atmosphere to a proportional part of the outlet port 51, each proportional part comprising about one-fourth of the total port area. As indicated in FIG. 10 each duct 61, 62, 63, and 64 has one or more guide vanes at its terminal end.

Because of the tortuous path the centrifugally propelled atmosphere must follow from the blower C, considerable turbulence is created and the exiting atmosphere does not take up uniform vertical flow lines. In order partially to correct this problem the outlet port 51 is provided with a grid 65 of straightening vanes arranged in a rectangular "egg crate" configuration and defining small square ports 66. The grid 65 serves to straighten the flow lines as the propelled atmosphere exits the port 51 and moves upward to the top of the furnace A. The grid 65 is particularly effective during the heating phase of the furnace operation. During the cooling phase the coils containing the refrigerant provide baffling which assists in accomplishing the same purpose. A flared skirt 67 is secured to the outlet duct F at the outlet port 51 to assist in directing the propelled atmosphere to the top of the furnace A.

While the invention has been shown and described with respect to specific embodiments thereof, this is intended for the purpose of illustration rather than limitation and other modifications and variations will be apparent to those skilled in the art within the spirit and scope of the invention. Accordingly the patent is not to be limited to the specific form shown and described herein nor in any way that is inconsistent with the extent to which the progress in the art has been advanced by the invention.

We claim:

1. In a furnace for heat treating open coils of metal strip including a shallow plenum located below a circular grid on which an open coil is positioned for treatment, heating elements above said coil and grid and a centrifugal blower located at one end of said plenum with its axis horizontal and projecting at about the center of said plenum for circulating atmosphere from said plenum to said heating elements and through said open coil, said blower having a diameter substantially greater than the height of said plenum, the improvement which comprises an inlet flow regulator located between said plenum and said blower and comprising a boxlike walled structure defining a chamber and having a vertical rear wall defining a central circular opening to said blower and a vertical front wall defining an elongated generally rectangular inlet opening communicating with said plenum and having dimensions generally corresponding to the height and width of said plenum, radial partitions extending axially within said chamber and dividing said circular opening into upper, lower and side quadrants, a vertical partition in said chamber dividing said inlet opening into a central inlet port and two end inlet ports, said vertical partition defining with said radial partitions a generally axial split duct from said central inlet port to said upper and lower quadrants of said blower opening, and said vertical partition also defining with said axial partitions two generally radial ducts from said end portion of said inlet opening to said side quadrants to equalize the flow rate of atmosphere in said furnace across the width of said plenum.

2. The inlet flow regulator of claim 1 in combination with an outlet duct for said centrifugal blower, the duct including a pair of spaced sidewalls perpendicular to the axis of said blower and located on opposite sides thereof and a plurality of curved partitions secured between said sidewalls and in the form of involutes generated from and spaced about the circumference of said blower, said partitions defining a plurality of curved ducts extending from said blower to an elongated outlet port located above said blower and extending transversely of said furnace, and a flow-straightening grid located in said outlet port, said grid having its plane dimensions approximately the same as those of said outlet port and comprising a plurality of thin vanes intersecting one another.

3. In a combination in a furnace for heat treating open coils of metal strip, a furnace chamber, a grid on which an open coil may be positioned in said chamber, a plenum disposed below said grid, heating elements in said chamber, a blower located at one end of said plenum and disposed to withdraw atmosphere from said plenum and discharge same upwardly into said chamber adjacent one end thereof, an inlet flow regulator disposed between said plenum and said blower and adapted to equalize the rate of flow of atmosphere across the width of said plenum when an open coil is supported on said grid and an outlet duct for said blower comprising generally involute-shaped partitions extending from the circumference of the blower and supported between spaced sidewalls and extending to an elongated outlet port located above said blower and extending transversely of said furnace.

4. The furnace of claim 3 including a flow-straightening grid at said outlet port, said grid being substantially coextensive with said outlet port and having a plurality of intersecting vanes whereby the flow of atmosphere from said outlet port is straightened and its turbulence reduced.

* * * * *